(12) United States Patent
Kawai et al.

(10) Patent No.: US 7,423,670 B2
(45) Date of Patent: Sep. 9, 2008

(54) REMOTE CONTROL OF IMAGE PICKUP APPARATUS

(75) Inventors: Tomoaki Kawai, Kanagawa (JP); Takashi Oya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/671,901

(22) Filed: Sep. 25, 2003

(65) Prior Publication Data

US 2004/0056964 A1 Mar. 25, 2004

(30) Foreign Application Priority Data

Sep. 25, 2002 (JP) .............................. 2002-279836

(51) Int. Cl.
*H04N 5/232* (2006.01)
*H04N 7/18* (2006.01)
*H04N 9/47* (2006.01)

(52) U.S. Cl. .............................. 348/211.99; 348/211.3; 348/211.6; 348/143

(58) Field of Classification Search .............. 348/211.6, 348/143, 155
See application file for complete search history.

(56) References Cited

U.S. PATENT DOCUMENTS

| 6,067,624 | A  | * | 5/2000  | Kuno ........................... 726/17 |
| 6,271,752 | B1 | * | 8/2001  | Vaios ......................... 340/541 |
| 6,323,897 | B1 | * | 11/2001 | Kogane et al. .............. 348/159 |
| 6,675,386 | B1 | * | 1/2004  | Hendricks et al. ........... 725/105 |
| 6,698,021 | B1 | * | 2/2004  | Amini et al. ................. 725/105 |

| 2002/0077136 | A1 | * | 6/2002 | Maggenti et al. ............ 455/518 |
| 2006/0070105 | A1 |   | 3/2006 | Kawai |

FOREIGN PATENT DOCUMENTS

| JP | 9-168145     |   | 6/1997 |
| JP | A 10-040185  |   | 2/1998 |
| JP | A 10-042278  |   | 2/1998 |
| JP | 10-105840    |   | 4/1998 |
| JP | 10-164559    |   | 6/1998 |
| JP | A 10-164554  |   | 6/1998 |
| JP | 2000-253383  |   | 9/2000 |
| JP | 2000244987 A | * | 9/2000 |
| JP | 2001-148846  |   | 5/2001 |
| JP | 2001-218194  |   | 8/2001 |
| JP | 2001218194 A | * | 8/2001 |
| JP | 2001245282 A | * | 9/2001 |

OTHER PUBLICATIONS

English Abstract for JPA 10-040185—Feb. 13, 1998.
English Abstract for JPA 10-042278—Feb. 13, 1998.
English Abstract for JPA 10-164554—Jun. 19, 1998.
Office Action dated Jul. 7, 2006 of basic Japanese Patent Application No. 2002-279836.

* cited by examiner

*Primary Examiner*—David Ometz
*Assistant Examiner*—Wanda M Negron
(74) *Attorney, Agent, or Firm*—Morgan & Finnegan, L.L.P.

(57) ABSTRACT

There is provided a method for controlling an image pickup apparatus in an image delivery system delivering an image acquired from the image pickup apparatus to at least one of multiple external devices, the image pickup apparatus being remotely controllable by the multiple external devices. In the method, the image pickup apparatus is controlled at a preset time based on preset control data, and remote control of the image pickup apparatus by predetermined external devices is inhibited during the control.

14 Claims, 15 Drawing Sheets

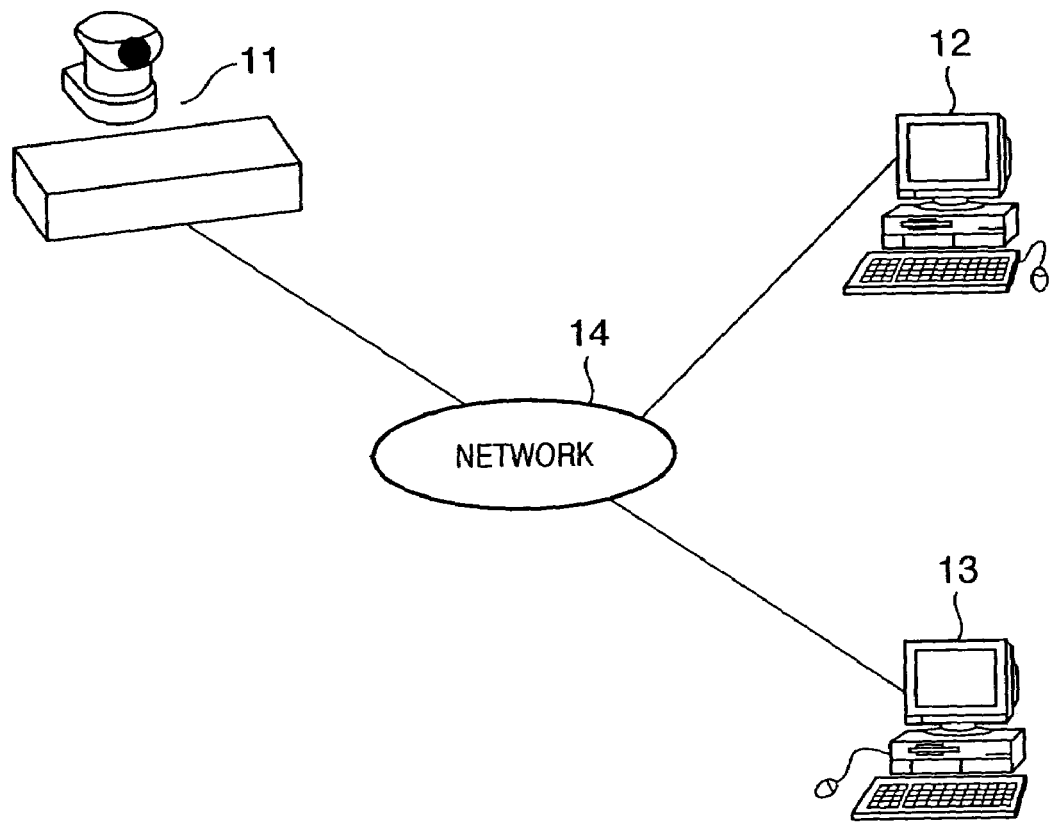
F I G. 1

FIG. 11A

| SCHEDULE NUMBER | STARTING TIME | ENDING TIME | AUTHORIZATION LEVEL | PRESET NUMBER | ABNORMALITY DETECTION CONDITION SETTING NUMBER |
|---|---|---|---|---|---|
| 1 | 7:30 | 10:00 | 3 | 3 | A |
| 2 | 12:00 | 13:30 | 2 | 2 | B |
| ..... | ..... | ..... | ..... | ..... | ..... |

FIG. 11B

| PRESET NUMBER | PAN | TILT | ZOOM |
|---|---|---|---|
| 1 | 70 | 0 | 1 |
| 2 | 20 | 10 | 2 |
| 3 | 0 | -10 | 1.5 |
| ..... | ..... | ..... | ..... |

FIG. 11C

| ABNORMALITY DETECTION CONDITION SETTING NUMBER | CHANGE THRESHOLD SENSITIVITY | DETECTION AREA | ..... |
|---|---|---|---|
| A | 70 | AREAS a1, a2 | |
| B | 20 | AREAS a3, a4, a5 | |
| ..... | ..... | ..... | |

FIG. 15A

| SCHEDULE NUMBER | STARTING TIME | ENDING TIME | AUTHORIZATION LEVEL | PRESET NUMBER | ABNORMALITY DETECTION CONDITION SETTING NUMBER | AUTHORIZED ADDRESS GROUP |
|---|---|---|---|---|---|---|
| 1 | 7:30 | 10:00 | 5 | 3 | A | 1 |
| 2 | 12:00 | 13:30 | 4 | 2 | B | 2 |
| ..... | ..... | ..... | ..... | ..... | ..... | ..... |

FIG. 15B

| AUTHORIZED ADDRESS GROUP | |
|---|---|
| 1 | 100.100.100.1<br>100.100.100.2<br>100.100.100.2 |
| 2 | 100.100.100.1 |
| 3 | 100.100.100.1<br>100.100.100.2<br>100.100.100.2 |
| ..... | ..... |

REMOTE CONTROL OF IMAGE PICKUP APPARATUS

FIELD OF THE INVENTION

The present invention relates to a technology of remotely controlling an image pickup apparatus in a system for delivering images sensed by a camera over a network.

BACKGROUND OF THE INVENTION

There has been provided a system which allows multiple people to see an image sensed by a camera provided at a remote location via a network, as well as enables the people to remotely control the pan and tilt angles or zoom magnification of the camera. For example, there has been developed a system which, by connecting a computer-controllable camera via a WWW server on the Internet to a personal computer also connected to the Internet, not only delivers real-time images taken by the camera to a user who has accessed to the system but also allows control of the camera (see Japanese Patent Laid-Open No. 10-040185, for example). The image-delivering side and the image-viewing side are in a server-client relationship.

In such a system which allows controlling of a camera and delivers images to multiple people at multiple locations, operation and observation are assumed to be performed by an unspecified number of users (clients). When a camera (server) is controlled by many people, authorization to control the camera is important (see Japanese Patent Laid-Open No. 10-042278, for example). A client who has acquired the authorization can control the camera. The authorization is released when a predetermined time period has elapsed.

In such a system, multiple levels of authorization are provided, and a higher level user (client) is given higher priority authorization when the user (client) controls the camera. It is disclosed that a different authorization time period is given to each of multiple priority levels (see Japanese Patent Laid-Open No. 10-164554, for example).

Such a system is not only used as a Web camera system, e.g., for the purpose of delivering appearances of sightseeing spots and roads and the like to an unspecified number of people over the Internet, but also often used as a security camera system, e.g., for the purpose of delivering images to particular people for crime prevention and the like.

When such a system is used for monitoring for the purpose of crime prevention, the image is not always seen by someone. Accordingly, in a conventional general monitoring system using an image, the image is continuously recorded so that the recorded image may be later checked in case any abnormality happens. Alternatively, by detecting an abnormality from motions of an image, the image is recorded or abnormality detection information is notified only when such an abnormality is detected.

In such a system allowing multiple people at multiple locations to view an image and enabling only one user at a time to control the camera by giving authorization to him/her as described above, the system administrator and a person who controls the camera are not always the same. For example, a camera may be used as a Web camera for delivering images to an unspecified number of people via the Internet during the day, and as a security camera directed to a particular direction for monitoring to detect an abnormality, such as trespass.

In this case, there is a possibility that an abnormality cannot be detected because an unexpected client has accessed the system and freely controlled the camera. Especially, when the camera is set to record abnormity detection results in an unwatched and automated operation, if the camera is controlled to be changed and fixed to face a direction different from the direction to be monitored or a different zoom magnification, it cannot perform the predetermined abnormality detection, and this may cause a serious problem.

SUMMARY OF THE INVENTION

The present invention has been made in consideration of the above situation, and its object is to prevent a camera from being controlled from a terminal other than a predetermined terminal during a particular operation thereof.

According to the present invention, the foregoing object is attained by providing a control method for controlling an image pickup apparatus in an image delivery system that delivers an image acquired from the image pickup apparatus to at least one of multiple external devices, the image pickup apparatus being remotely controllable by the multiple external devices, the method comprising: controlling the image pickup apparatus at a preset time based on preset control data; and inhibiting remote control of the image pickup apparatus by a predetermined external device during the control performed based on the control data.

According to the present invention, the foregoing object is also attained by providing an image delivery apparatus that delivers images acquired from an image pickup apparatus to at least one of multiple external devices, the image pickup apparatus being remotely controllable by the multiple external devices, the image delivery apparatus comprising: a data storage medium that stores control data to control the image pickup apparatus and a start time to start control using the control data; a schedule execution unit that starts control of the image pickup apparatus based on the control data at the start time; and a restriction unit that inhibits remote control of the image pickup apparatus by a predetermined external device during control by said schedule execution unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 shows a system configuration according to an embodiment of the present invention;

FIGS. 11A to 11C show an example of a set schedule according to the embodiment of the present invention;

FIGS. 15A and 15B show an example of a set schedule according to a second embodiment of the present invention.

DETAILED DESCRIPTION OF THE PREFERRED EMBODIMENTS

Figure 2:
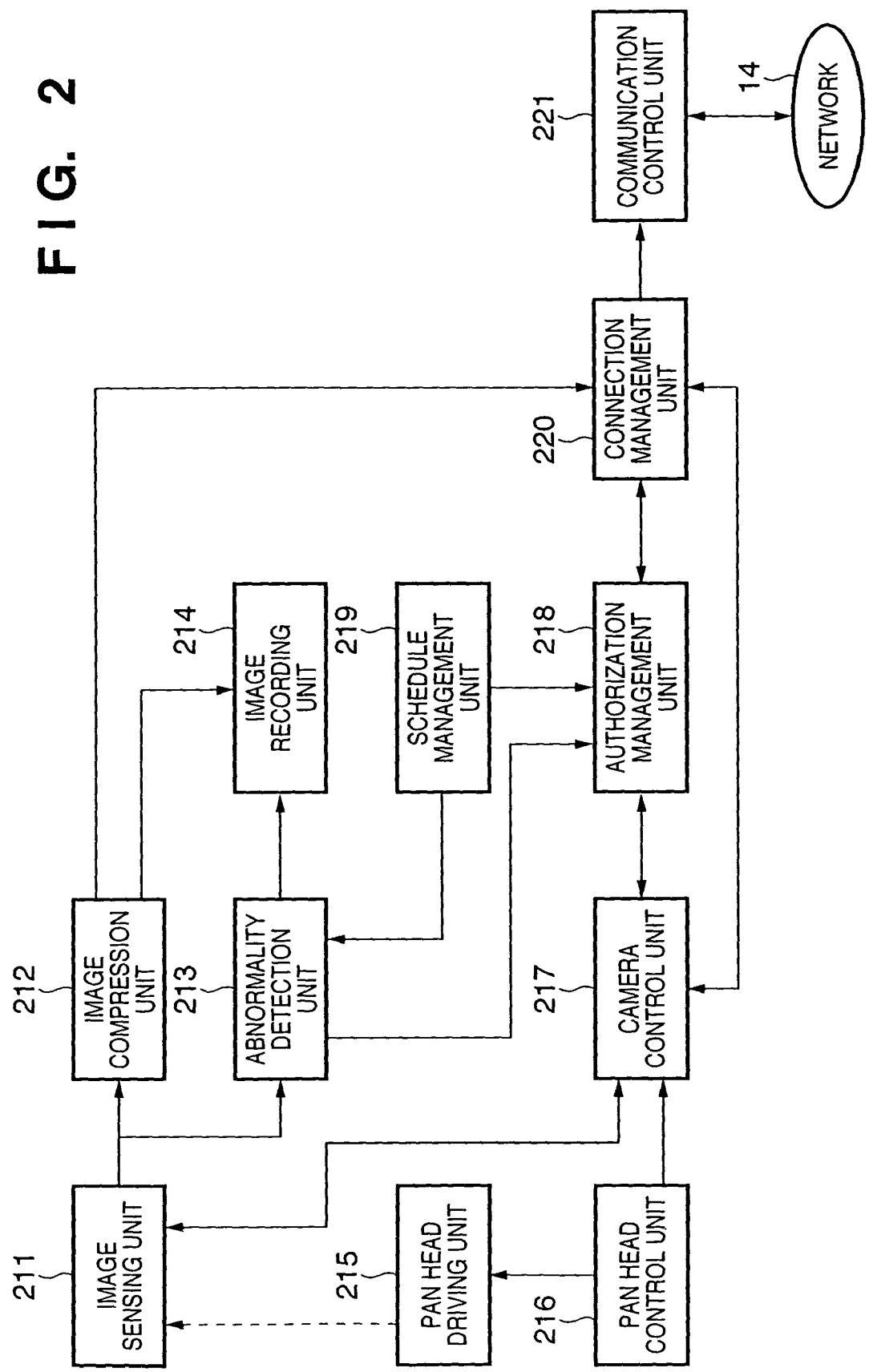
FIG. 2 is a block diagram showing a configuration of a camera server device according to the embodiment of the present invention.

Preferred embodiments of the present invention will be described in detail in accordance with the accompanying drawings.

First Embodiment

In the first embodiment, in addition to a feature of allowing multiple user to control a camera while delivering a real-time image to the multiple users, there is also provided a feature of controlling and fixing a camera at camera control values (combination of pan, tilt and zoom) which have been preset at a particular camera control level, which is later described, during a particular time period according to a preset schedule to perform an abnormality detection process described later and save the image when any abnormality happens.

FIG. 1 shows a system configuration according to the first embodiment of the present invention.

In FIG. 1, the reference numeral 11 denotes a camera server device; 12, a general user terminal; and 13, an administrator terminal, all of which are connected via a network 14. A camera, whose pan, tilt and zoom can be operated, is connected to the camera server device 11. The camera server device 11 delivers a real-time image via the network 14 in response to a request by the terminals 12, 13 and enables the terminal 12, 13 to control the camera. Furthermore, the camera server 11 executes an abnormality detection function for a particular time period specified in advance and saves the image in case any abnormality happens.

Though multiple camera server devices 11, general user terminals 12, and administrator terminals 13 may be connected to the network 14, it is assumed that just one for each is connected in this first embodiment, for simplification of explanation. The network 14 may be any digital network, such as the Internet and an intranet, having a band enough to transmit camera control signals and compressed image signals, which are described later. The network protocol used here is assumed to be the TCP/IP (UDP/IP) protocol, and the "address" used in the description below indicates an IP address. Each of the camera server device 11 and the terminals 12, 13 is assumed to be assigned an IP address.

The configuration of each of the above-mentioned devices is now described below.

FIG. 2 is a block diagram showing a configuration of the camera server device 11. The camera server device 11 is composed of: an image sensing unit 211 which uses a CCD and the like to sense an image as a digital image signal; a pan head driving unit 215 capable of electronically controlling the pan and tilt angles to set an image sensing direction of the image sensing unit 211; a pan head control unit 216 for controlling the pan head driving unit 215; a camera control unit 217 for controlling the zoom magnification of the image sensing unit 211 and controlling the pan and tilt angles of the pan head driving unit 215 via the pan head control unit 216; an image compression unit 212 for compressing an image inputted from the image sensing unit 211; an abnormality detection unit 213 for detecting an abnormality, such as trespass, from the inputted image; an image recording unit 214 for recording the image when any abnormality is detected; a schedule management unit 219 for managing a schedule of the abnormality detection function; an authorization management unit 218 for managing external authorization to be given to the terminals 12, 13 and internal authorization to be given based on the schedule; a connection management unit 220 for managing connection to the terminals 12, 13 for image delivery and camera control; and a communication control unit 221 for controlling image delivery to or communication of camera control data with the terminals 12, 13 via the network 14. A part of the foregoing configuration (the image sensing unit 211 and the pan head driving unit 215, for example) may be separately configured.

The camera server device 11 captures a digital image sensed by the image sensing unit 211, compresses it in Motion JPEG format at the image compression unit 212, and delivers the compressed image to all the connected terminals 12, 13. The camera server device 11 also accepts a camera control command from the terminal 12 or 13 which has acquired authorization, and controls the zoom magnification of the image sensing unit 211 and the pan head driving unit 215 based on the command. Furthermore, the camera server device 11 acquires authorization based on a schedule set in advance by the schedule management unit 219 to perform camera control and operate the abnormality detection function. If detecting any abnormality, the camera server device 11 saves the image in the image recording unit 214. Though Motion JPEG compression is used here as the compression format of an image, a compression format using inter-frame correlation with a higher compression rate, such as H263, may be used, and the present invention is not restricted by a compression format.

Figure 3:
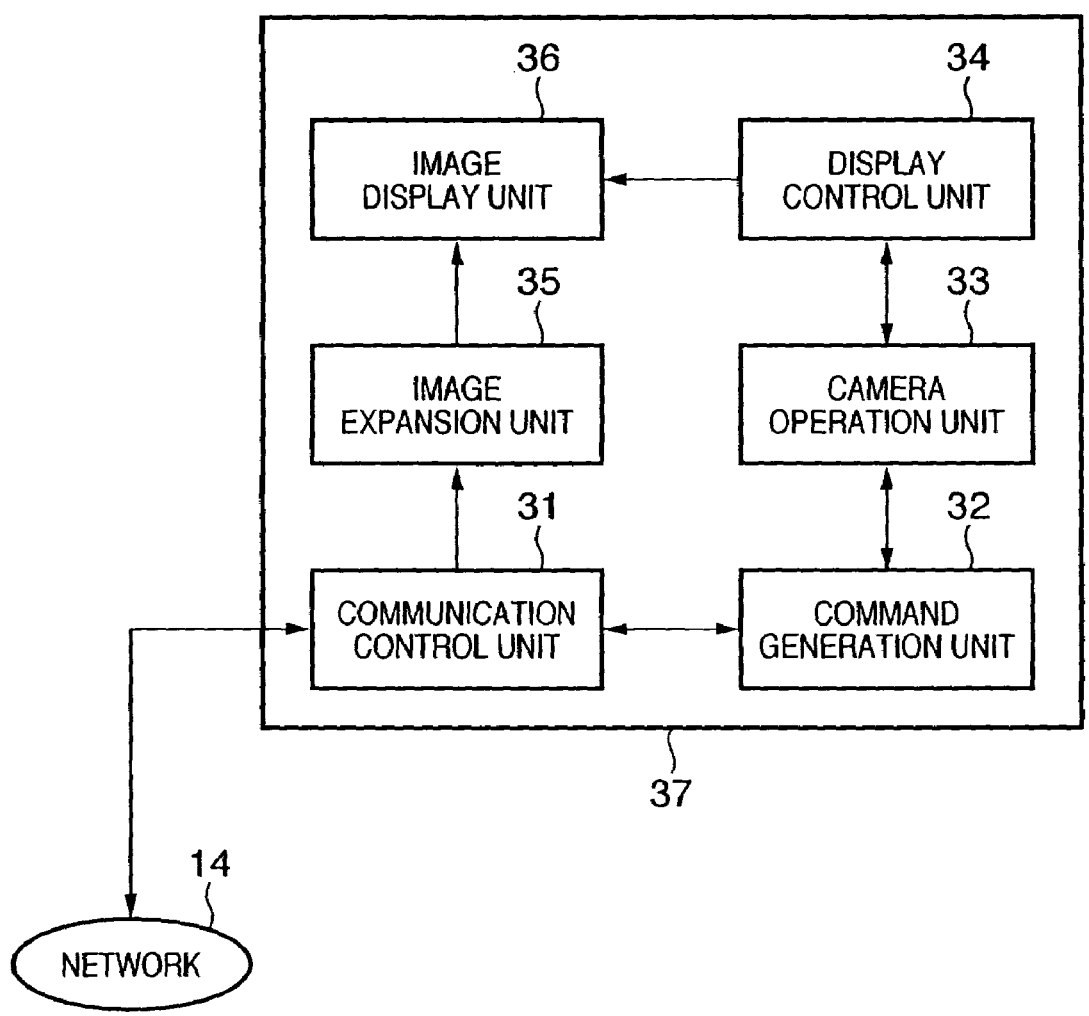
FIG. 3 is a block diagram showing a configuration of a terminal according to the embodiment of the present invention.

The configuration and operation of the terminals 12, 13 are now described with reference to FIG. 3. Two kinds of logical channels, that is, an image delivery connection for delivering an image from the camera server device 11 to the terminals 11, 12 and a camera control connection for controlling the camera server device 11 from the terminals 11, 12 are established between the camera server device 11 and the terminals 12, 13 as necessary. As seen from the camera server device 11, multiple image delivery connections can be established with multiple terminals, while only one camera control connection is established with one terminal at a time.

Figure 4:
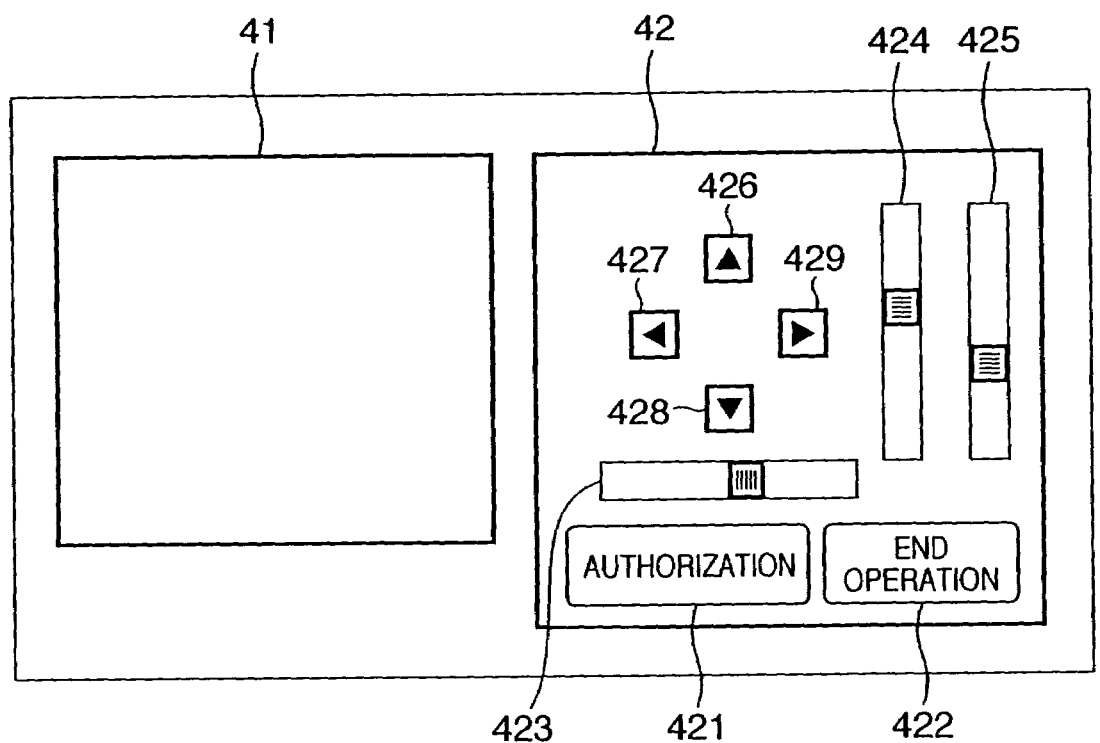
FIG. 4 shows an example of an operation screen.

When an image delivery connection is established, compressed image data delivered from the camera server device 11 via the network 14 is received through a communication control unit 31, expanded at an image expansion unit 35, and then displayed on an image display unit 36. The operation screen shown in FIG. 4 is displayed on the image display unit 36 of the terminals 12, 13 by a display control unit 34 to allow a camera control operation to be performed via a camera operation unit 33. On the terminals 12, 13, there is operated some window system, such as Windows™, capable of configuring a user interface screen as shown in FIG. 4 on the image display unit 36, so that a screen as shown in FIG. 4 can be displayed.

In FIG. 4, the reference numeral 41 denotes an image display panel on which an image is displayed; and 42, a camera control panel for operating the camera. The pan, tilt and zoom of the camera can be controlled by operating scroll bars 423, 424, 425, respectively. The pan and tilt of the camera can also be controlled with buttons 426 to 429. Such camera control operations are valid only when the terminal 12 or 13 retains authorization. In order to acquire authorization, a user first presses down an authorization button 421. In response to this, a command generation unit 32 generates a camera control start request and sends it to the camera server device 11. If authorization is acquired, then the user can operate the camera.

Figure 5:
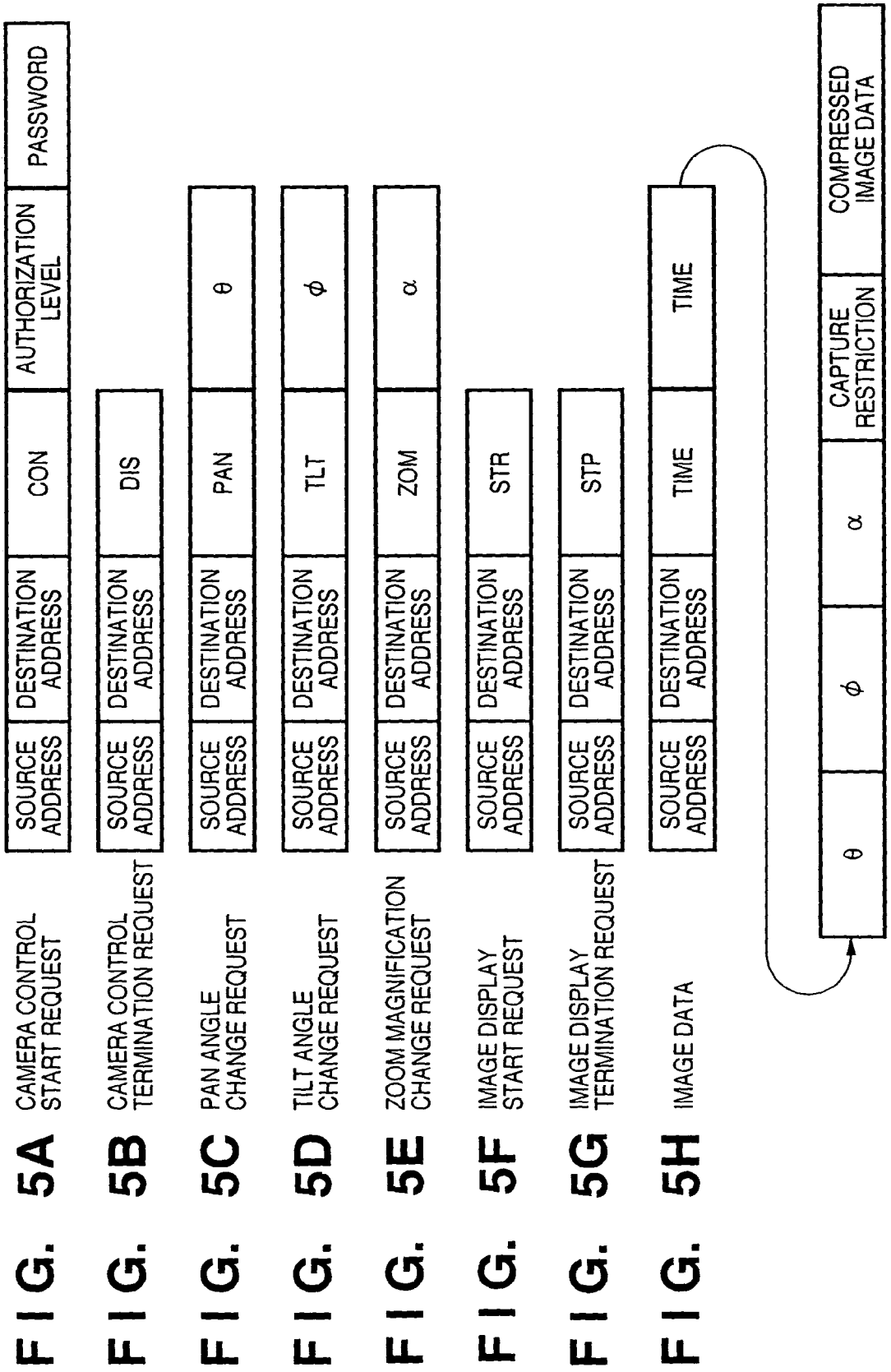
FIGS. 5A to 5H show a command and a data packet format according to the embodiment of the present invention.

When the user acquires authorization and performs an operation via the camera operation unit 33, the command generation unit 32 generates a command as shown in FIGS. 5C to 5E and issues it to the camera server device 11 via the communication control unit 31 in response to the user operation. The operation is described in detail later.

In this way, data in a packet format as shown in FIGS. 5A to 5H is exchanged between the camera server device 11 and the terminals 12, 13 via the network 14. Strictly speaking, a format used for a packet for TCP/IP, UDP/IP and the like is used. However, only packet information necessary for explanation of the first embodiment is shown in FIGS. 5A to 5H. The camera server device 11 basically operates in response to a request from the terminals 12, 13. Every request includes IP addresses of the source and the destination.

Each of the packets shown in FIG. 5A to 5H is now described below.

The camera control start request command of FIG. 5A requests not only authorization but also establishment of a camera control connection to start camera control. An authorization level and a password are specified then.

The camera control termination request command of FIG. 5B requests not only release of authorization but also disconnection of a camera control connection to terminate camera control.

A camera control command is issued while a camera control connection is established. The pan angle change request command of FIG. 5C, the tilt angle change request command of FIG. 5D and the zoom magnification change request command of FIG. 5E are shown as camera control commands. The $\theta$, $\phi$, and $\alpha$ shown in the figures are parameters indicating the pan angle, the tile angle and the zoom magnification, respectively. In addition to these, there may be various camera control commands such as commands for back light compensation, auto-focus, manual focus-value setting and the like, though description thereof is omitted here.

The image display start request command of FIG. 5F is issued when the terminals 12, 13 connects to the camera server device 11 to request start of delivering an image (image delivery connection).

The image display termination request command of FIG. 5G is for requesting termination of delivering an image to disconnect an image deliver connection between the terminals 12, 13 and the camera server device 11.

The image data of FIG. 5H is compressed image data delivered from the camera server device 11, and an image is delivered one frame by one frame, that is, each of JPEG frames is delivered as separate packet data.

Operations of the camera server device 11 according to the first embodiment is now described using flowcharts of FIGS. 6 to 10.

Figure 6:
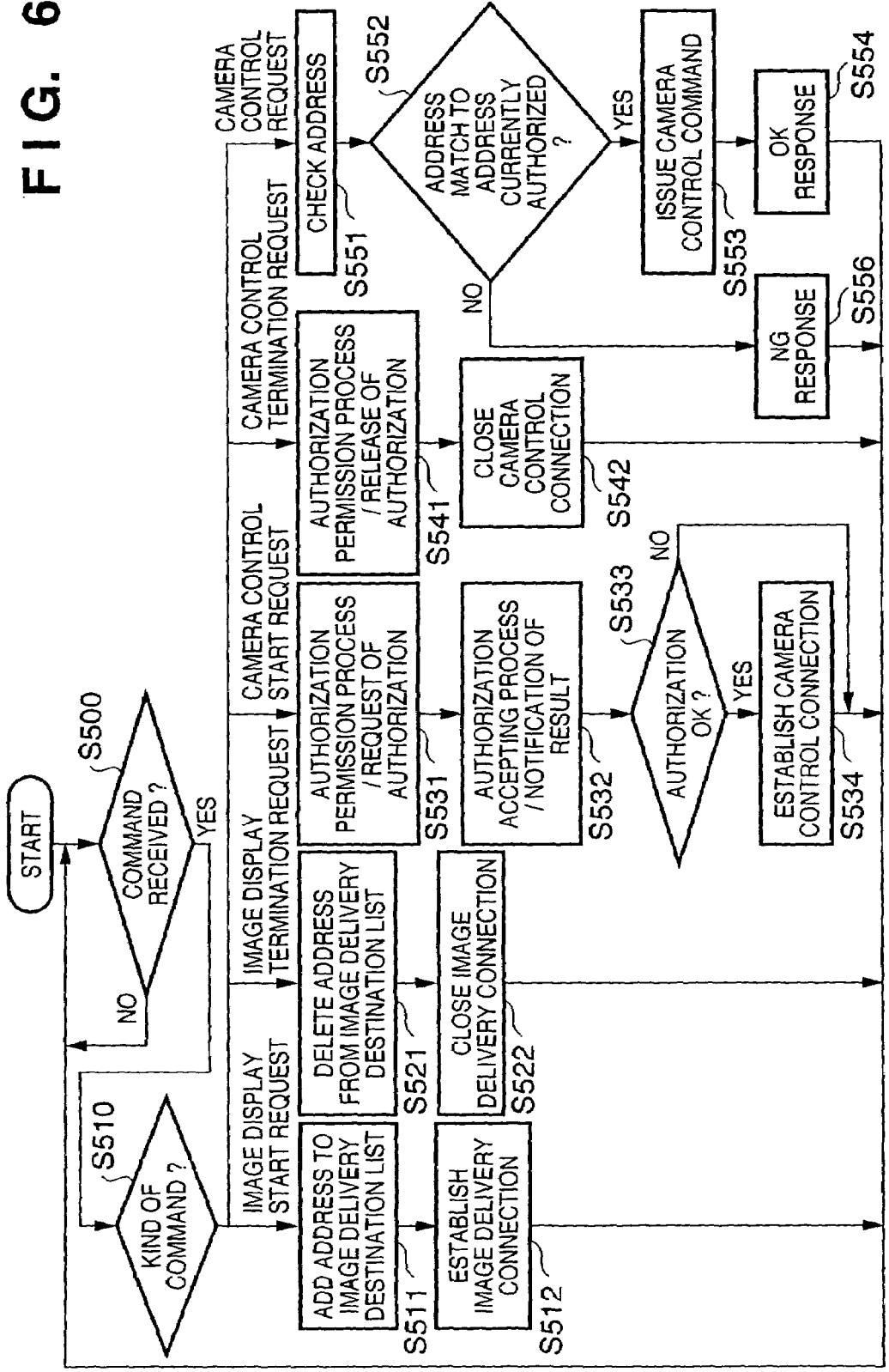
FIG. 6 is a flowchart showing processing of a connection management unit according to the embodiment of the present invention.

FIG. 6 shows an operation flow of the connection management unit 220 of accepting a request as shown in FIGS. 5A to 5H (step S500), performing connection management and interpretation of the request (step S510), and then controlling each unit within the camera server device 11 based on the request.

When the image display start request (FIG. 5F) is accepted, the source address included in the request is added to an image delivery destination list at step S511, and an image delivery connection is established at step S512. The image delivery destination list holds all the addresses of delivery destinations to deliver an image in a list format. An image is delivered to all the addresses specified in this list.

Furthermore, when the image display termination request (FIG. 5G) is accepted, the source address included in the request is deleted from the image delivery destination list at step S521 to delete it from the image delivery destinations. Then, at step S522, the image delivery connection is closed.

Figure 7:
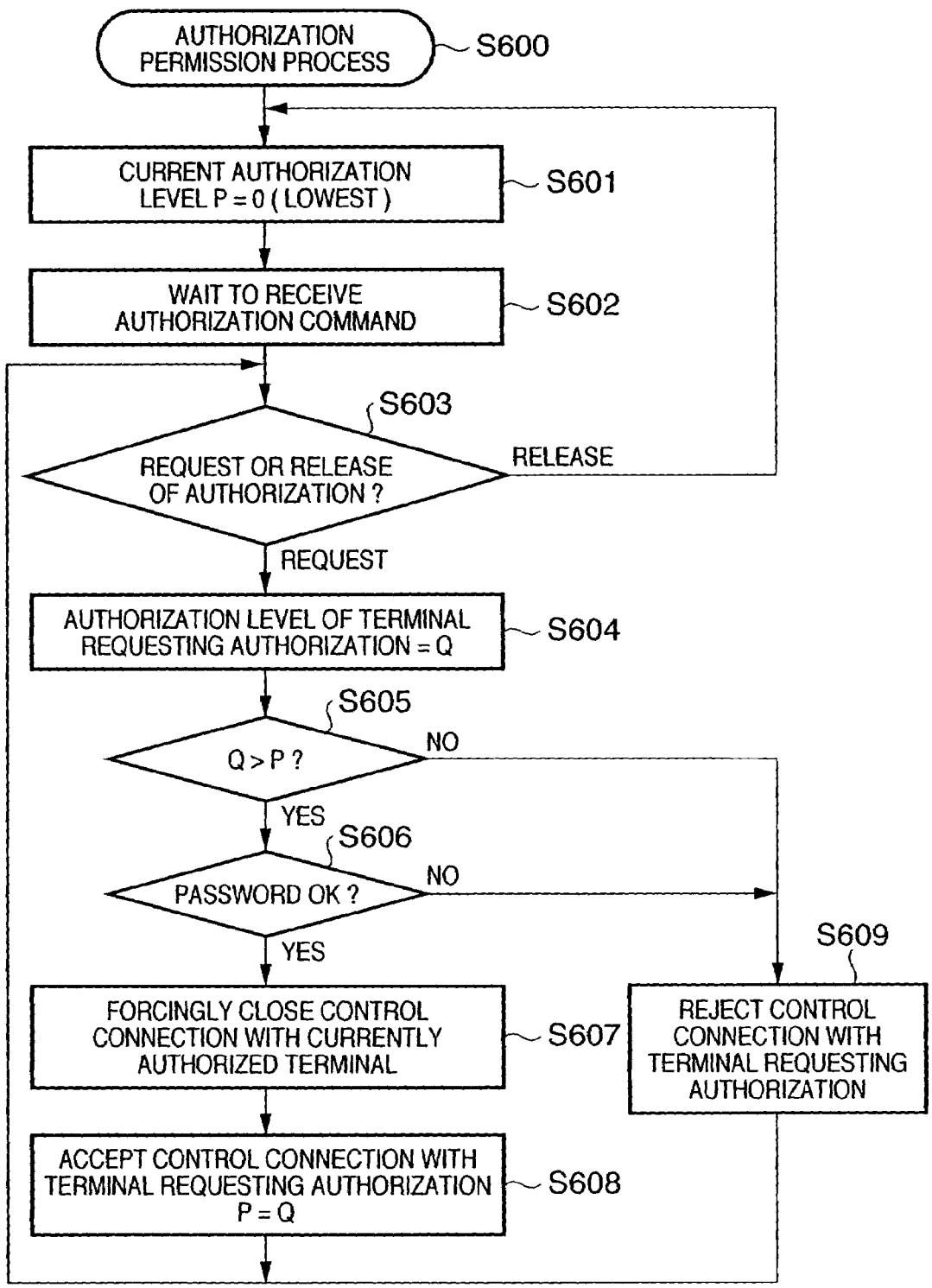
FIG. 7 is a flowchart showing processing of an authorization management unit according to the embodiment of the present invention.

When the camera control start request (FIG. 5A) is accepted, acquisition of authorization is requested to the authorization management unit 218 at step S531. The authorization management unit 218 determines whether or not authorization is granted through an authorization permission process (FIG. 7). At step S532, the result is determined and replied to the terminal, and if authorization is granted (in the case of YES at step S533), a camera control connection is established at step S534.

When the camera control termination request (FIG. 5B) is accepted, release of authorization is requested to the authorization management unit 218 at step S541, and the camera control connection is closed at step S542.

When the camera control request (FIGS. 5C to 5E) is accepted, it is determined whether or not the terminal which issued the request is authorized by checking the address thereof at step S551. If the address does not match (in the case of NO at step S552), then it is replied that control is not to be performed because the request is from an unauthorized terminal (step S556). On the contrary, if the address matches (in the case of YES at step S552), then camera control such as pan, tilt and zoom control is performed via the camera control unit 217 based on the request at step S553, and then the result is sent to the terminal which sent the request at step S554.

FIG. 7 is a flowchart of an authorization management process at the authorization management unit 218. In the first embodiment, an authorization level indicating priority of authorization is used. In this case, the lowest is "0", and the larger the number is, the higher the authorization level is. Four levels are herein assumed with 0 as a general level, 1 to 3 as a scheduler level, and 2 as an administrator level.

The general level is a level of the ordinary terminal 12, and the administrator level is a level of the terminal 13 for an operator with a particular privilege. Generally, when the camera is used as a Web camera accessed by an unspecified number of terminals, the level of the unspecified number of terminals is set to 0, the general level; and when used not only as a Web camera but also as a security camera, operation is allowed for a system operator/administrator with the administrator level 2 authorization. To achieve this, there is provided a mechanism to enable the authorization level to be set higher than the general level for each terminal (or every time the operation screen of FIG. 4 is activated). For example, by displaying a GUI panel enabling a combination of a privilege level and a password to be specified to establish a connection only when connection is made at the administrator level 2, and then permitting the administrator level 2 connection only when the password matches and the connection is authorized, the authorization level can be set higher than the general level. The password may be set for each terminal in advance, or it may be inputted on a password request screen to be displayed when the operation screen of FIG. 4 is activated. The password may be automatically generated based on the unique address of each operation terminal, instead of being specified by a user. On the camera server device 11, it is possible to set an authorization level corresponding to the address for each terminal by checking the address. Accordingly, the administrator level 2 can be given only to terminals with particular addresses. There may be other methods for setting the administrator level higher, in addition to the limitation based on a password or a terminal address, and any method may be used only if a general level user cannot easily establish the administrator level connection. In this embodiment, a general method utilizing a password is assumed in the description below.

As for a scheduler level, any one from 1 to 3 is selected when a schedule is set. Then, according to the scheduler process shown in FIG. 12, which is described later, the schedule becomes valid at the selected authorization level, authorization is acquired, and then the camera is fixed at particular camera control values (values of the pan, tilt and zoom) which have been set in the schedule.

The authorization level is initially set to the lowest 0 (step S601). At step S602, an authorization command is received. Concretely, a command of FIG. 5A or 5B is received. At step S603, it is determined whether the command is a request or release of authorization. If the command is a request of authorization, the process proceeds to step S604 and acquires the authorization level (Q) of the terminal requesting authorization from the camera control request command of FIG. 5A. If the authorization level (Q) of the terminal requesting authorization is higher than the authorization level (P) of the currently authorized terminal (in the case of YES at step S605), and if the password in the camera control start request command of FIG. 5A can be authorized (in the case of YES at step S606), then the control connection with the currently authorized terminal is forcedly closed (step S607) and the camera control start request command of the terminal requesting authorization is accepted and the current authorization level P is updated to Q (step S608). If the condition of step S605 or S606 is not satisfied, then the camera control start request command is not accepted (step S609).

If the command accepted at step S602 is a request to release authorization, then the process returns to step S601 and returns the current authorization level P to the initialization state, that is, 0. It should be noted that when the scheduler is forcedly terminated, the forced disconnection process in step S607 is not performed.

Though there are four authorization levels in the first embodiment, any number of authorization levels may be provided only if the number is sufficient for operation.

Figure 8:
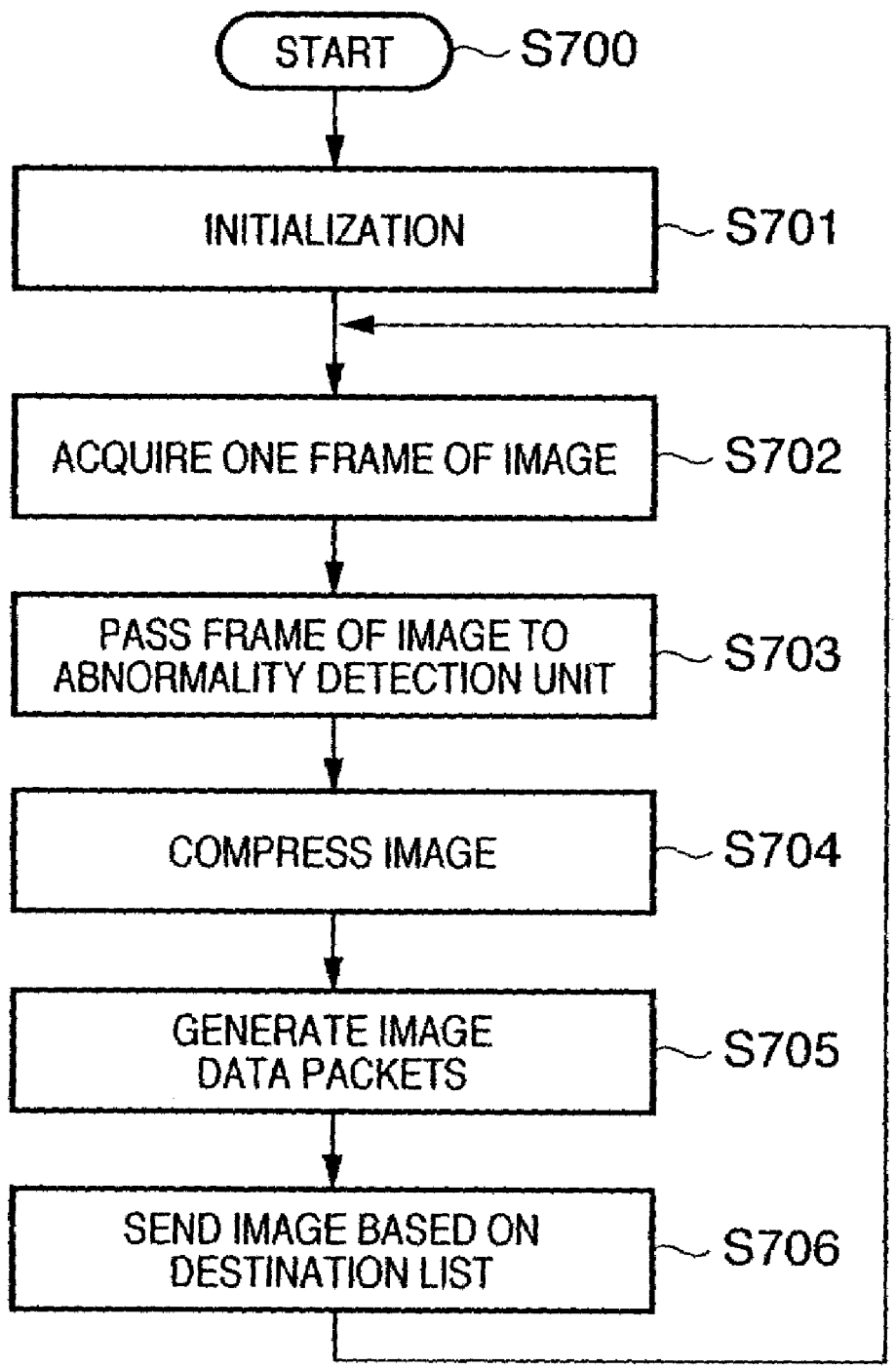
FIG. 8 is a flowchart of image delivery processing according to the embodiment of the present invention.

FIG. 8 is a flowchart showing processing from image acquisition to delivery, which is to be performed at the camera server device 11. Necessary initialization is first performed at step S701, and then, an image is acquired by frame from the image sensing unit 211 (step S702). The acquired image is passed to the abnormality detection unit 213 one frame by one frame for abnormality detection (step S703). They are also passed to the image compression unit 212 for JPEG compression (step S704) to generate image data packets as shown in FIG. 5H (step S705). The generated image data packets are delivered to all the delivery destination addresses registered in the image delivery destination list (step S706). The process from step S702 to step S706 are repeatedly performed.

Figure 9:
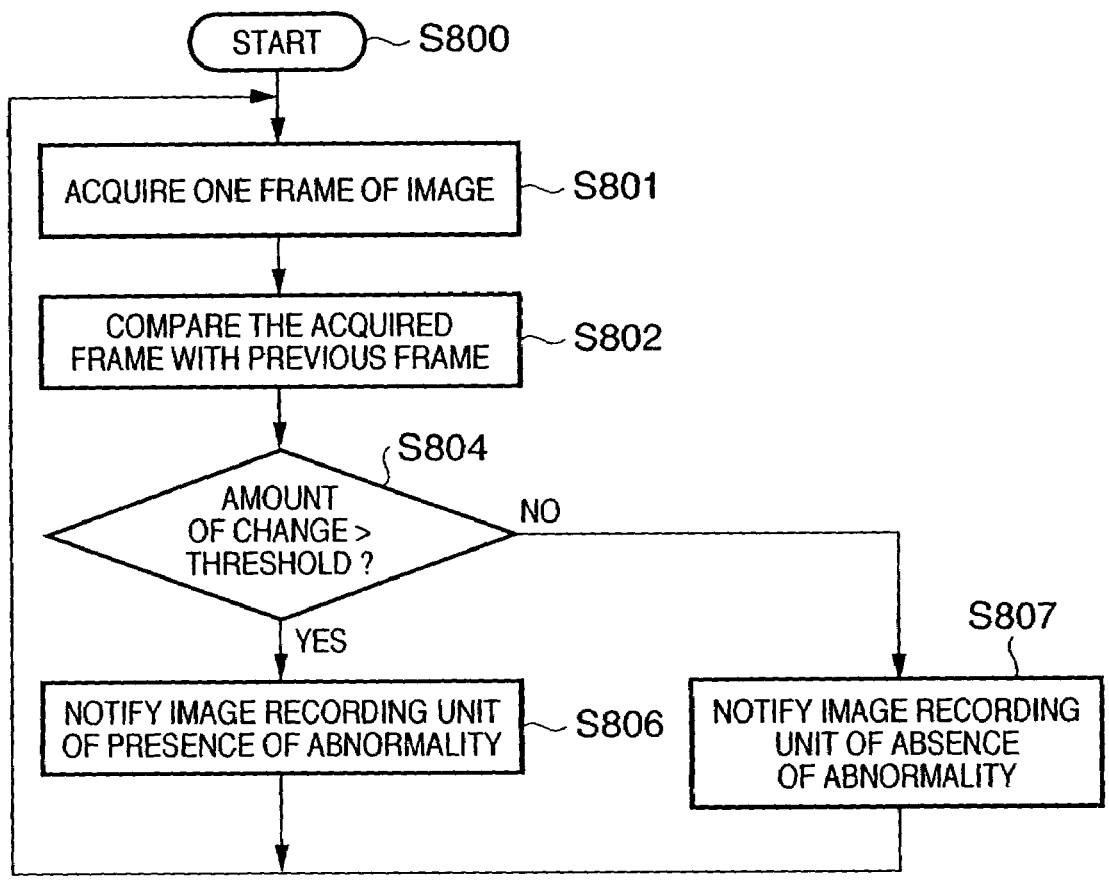
FIG. 9 is a flowchart showing abnormal detection processing of an abnormal detection processing unit according to the embodiment of the present invention.

FIG. 9 is a flowchart of an abnormality detection process to be performed in the abnormality detection unit 213. A frame of image is newly acquired (step S801). The newly acquired frame is compared with the immediately previous frame of the image (step S802). If the amount of change between the frames exceeds a certain threshold (in the case of YES at step S804), then an abnormality is determined and notified to the image recording unit 214 (step S806). The image recording unit 214 records the image in which the abnormality has been detected. If the amount of change is equal to or below the threshold, the image recording unit 214 is notified that there is no abnormality. The process from step S801 to S807 is repeatedly performed. Note that in the case of no abnormality being detected, the process may return to step S801 without notifying it to the image recording unit 214.

In the description of the abnormality detection method shown in FIG. 9, an abnormality is determined when difference between frames (change in an image) is above a predetermined value. However, the present invention is not limited thereto, and other methods may be also used, such as a method determining an abnormality based on background difference of an image. An abnormality may be determined, using an external sensor such as an infrared sensor, by detecting an abnormality signal from the external sensor. Any method may be used only if, when a schedule is executed, an abnormality can be detected based on abnormality detection setting in FIG. 11C, which is described later, and the image storage and the like can be performed.

Figure 10:
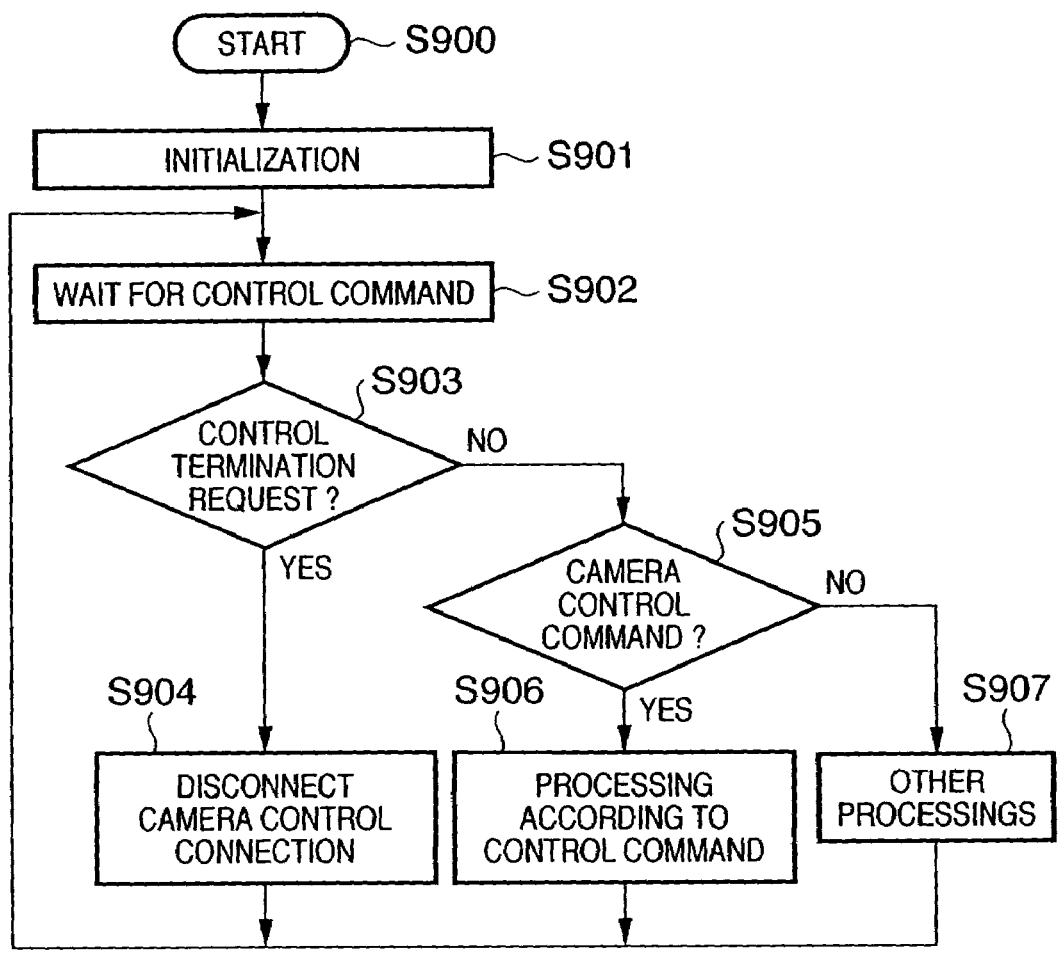
FIG. 10 is a flowchart showing processing of a camera control unit according to the embodiment of the present invention.

FIG. 10 is a flowchart showing processing to be performed in the camera control unit 217. After predetermined initialization (step S901), a control command is received (step S902). If it is a camera control termination request by the authorization management unit 218 (in the case of YES at step S903), then the connection management unit 220 is caused to forcingly closed the camera control connection (step S904). If it is a camera control command (in the case of YES at step S905), then a command is issued to the pan head control unit 216 when the request command is determined to be a pan or tilt angle command from the content of the camera control command, and a command is sent to the image sensing unit 211 when the request command is determined to be a zoom command (step S906). If the control command accepted at step S902 is neither a camera control termination request nor a camera control command, then the process proceeds to step S907 and performs processing corresponding to the control command.

A schedule in the first embodiment is now described.

A schedule is set in advance in a form shown in FIG. 11A. A scheduler operates in accordance with the set schedule. Each schedule shown in FIG. 11A is composed of a schedule number, starting time, ending time, authorization level, preset number, and abnormality detection condition setting number. The preset number indicates a combination of pan, tilt and zoom values as shown in FIG. 11B, and the abnormality detection condition setting number indicates various parameters such as a change threshold used for abnormality detection and a detection area in an image area as shown in FIG. 11C. When setting a schedule, a time period during which scheduled operation is to be performed is determined, and it is specified what image sensing conditions (for pan, tilt, and zoom, for example) and what abnormality detection parameters should be used. By further specifying an authorization level, it is possible to set the levels of terminals which is to be inhibited from performing camera control during the scheduled operation.

Figure 12:
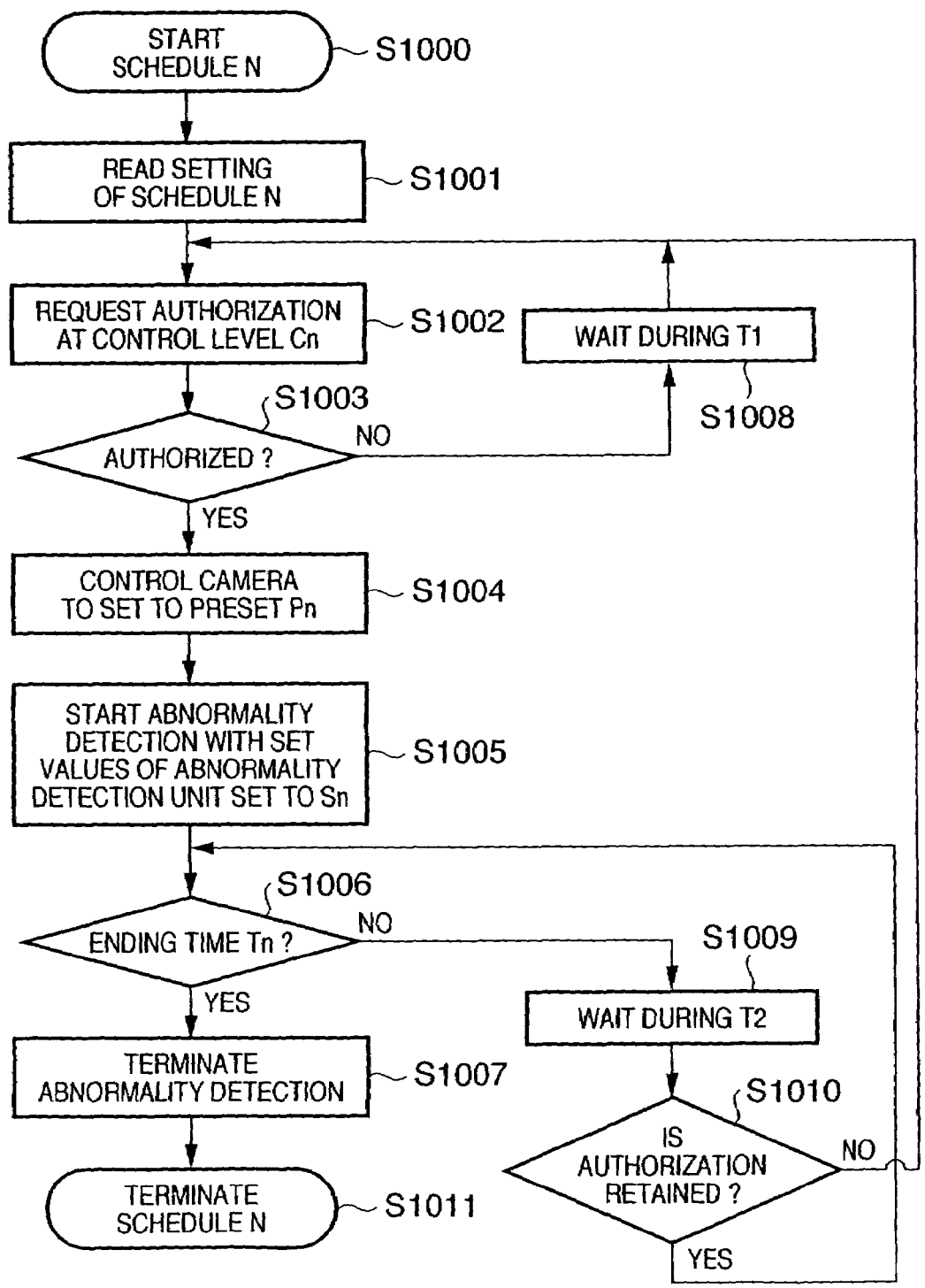
FIG. 12 is a flowchart showing processing of a schedule management unit according to the embodiment of the present invention.

FIG. 12 is a flowchart showing scheduler processing operating in the schedule management unit 219. In FIG. 12, in principle, an authorization request is issued until the schedule management unit 219 can acquire authorization. When authorization is acquired, the authorization is retained during the scheduled time period to perform a process of abnormality detection operation. As described above, a schedule is registered within a scheduler of the schedule management unit 219 in a form of a table as shown in FIG. 11A. When the time matches the starting time of any schedule in the table, a process for the schedule is started, and the schedule setting of the schedule number of that schedule is read in (step S1001). Suppose that the authorization level of the read schedule in the table of FIG. 11A is Cn, the preset number, Pn, the abnormality detection condition setting number, Sn, and the schedule ending time, Tn. In this case, authorization is first requested to the authorization management unit 218 at the authorization level Cn. If the authorization cannot be acquired (in the case of NO at step S1002), the process waits during a predetermined time period T1 (step S1008) and then returns to step S1002 to issue a request again. The steps S1002, S1003 and S1008 are repeated until authorization can be acquired. However, if authorization has not been acquired by the ending time Tn, the process ends.

If authorization is acquired (in the case of YES at step S1003), then camera control indicated by the preset number Pn in the table of FIG. 11B is performed to change the pan angle, tile angle and zoom of the camera (step S1004). Furthermore, the abnormality detection unit 213 is set based on the abnormality detection condition setting number Sn in the table of FIG. 11C and the abnormality detection process shown in FIG. 9 is started (step S1005). At step S1006, the process waits until the ending time period Tn. At the ending time Tn, the abnormality detection process is stopped (step S1007). The scheduler process then ends.

If the scheduled operation is started when a terminal with an authorization level lower than the scheduler holds the authorization, the authorization should be taken away from the terminal by the scheduler. On the contrary, authorization may be taken away from the scheduler by a terminal with an authorization level higher than that of the scheduler.

When the time is not the ending time Tn, (in the case of NO at step S1006), then the process waits during a predetermined time period T2, then determines whether or not the authorization is still retained at step S1010. If the authorization is retained (in the case of YES at step S1010), then the process returns to step S1006. If the authorization has been taken away (in the case of NO at step S1010), then the scheduler returns to step S1002 to wait until authorization can be acquired again. When a higher authorization level terminal releases authorization, the scheduler acquires authorization again to perform its scheduled operation. The abnormality detection function automatically recovers in accordance with the schedule shown in FIG. 11A.

Figure 13:
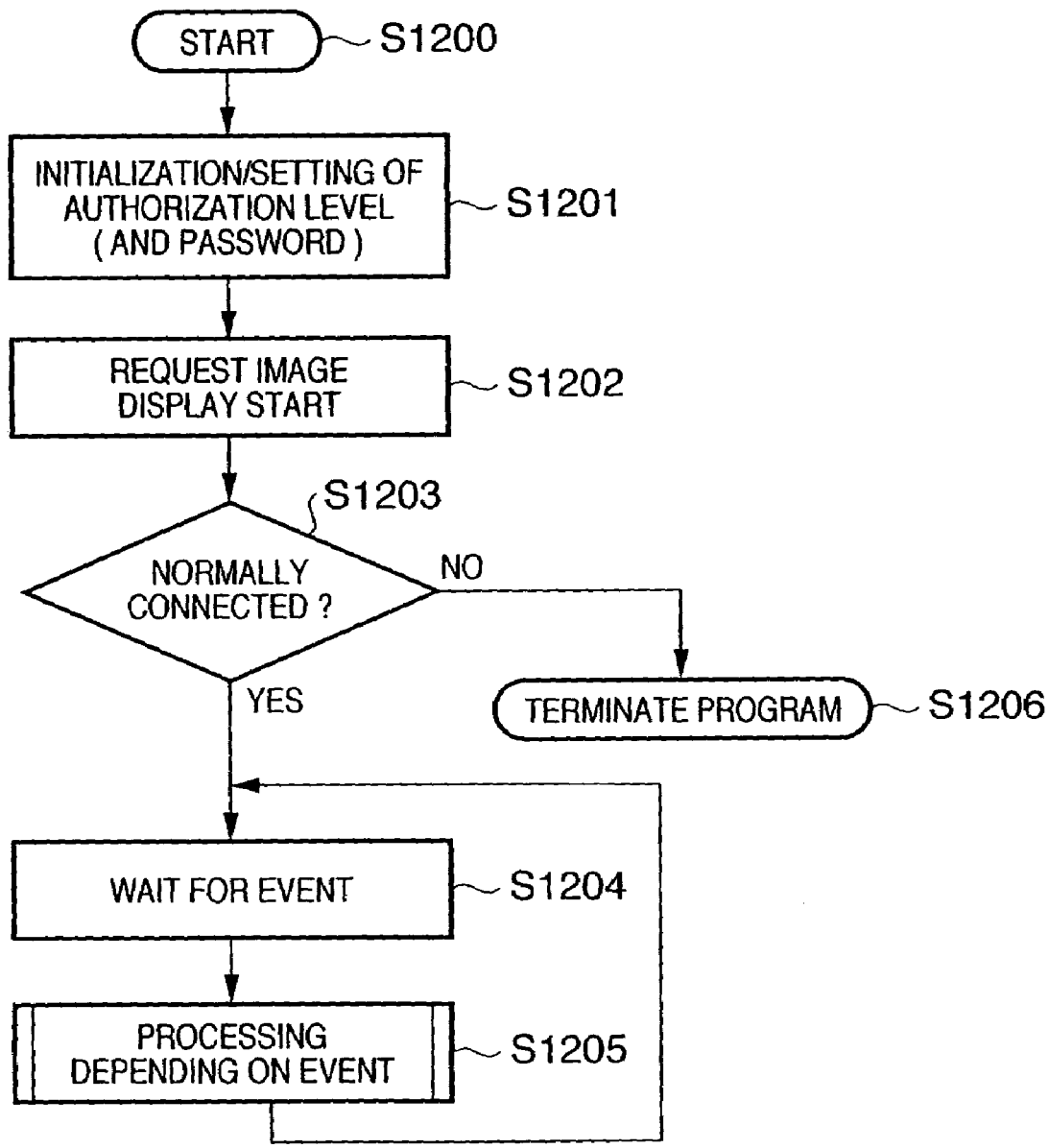
FIG. 13 is a flowchart showing processing of a terminal according to the embodiment of the present invention.

A client program as shown in FIG. 13 operates on the terminal 12. The operation of the client program is shown in FIG. 13. As shown in steps S1200 to S1205, the client program on the terminal 12 operates on the event basis in principle. When operation of the operation screen (FIG. 4) or arrival of an image data packet causes an event, a process correspondent to the event is performed.

When activated with the address of the camera server device 11 to be connected specified, the client program sends the image display start request command of FIG. 5F to the corresponding camera server device 11 (step S1202). If no response is returned from the corresponding camera server device 11 (in the case of NO at step S1203), the process ends because there is any operation abnormality due to a mistaken address and the like. If a response is returned, the connection was successful (in the case of YES at step S1203), the process waits for an event, that is, a user operation of the user interface shown in FIG. 4 or a reception of an image packet from the camera server device 11 (step S1204), and performs a process suitable for the event (step S1205).

Figure 14:
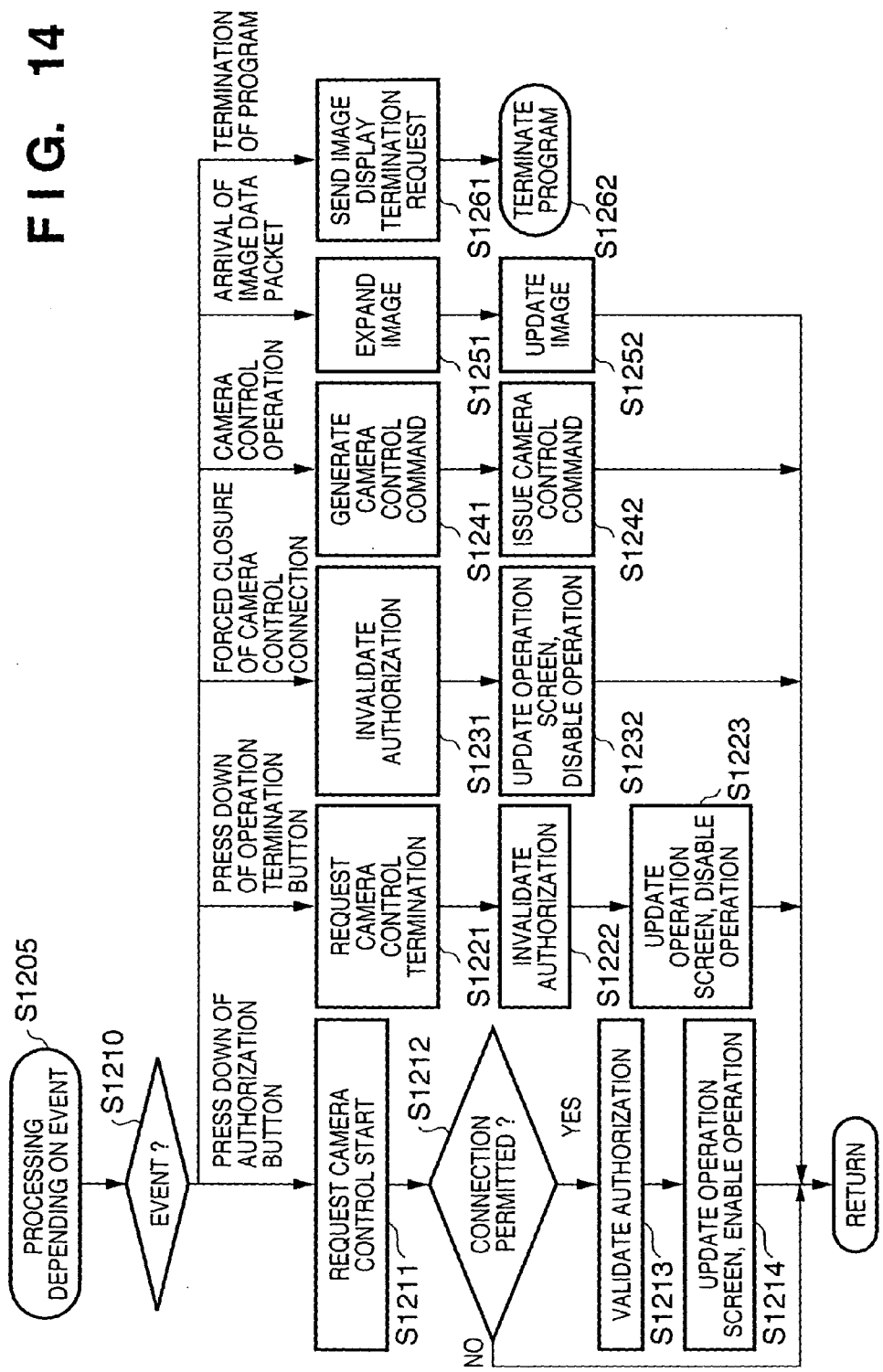
FIG. 14 is a flowchart illustrating events and corresponding processes according to the embodiment of the present invention.

FIG. 14 is a flowchart showing examples of event and examples of the corresponding process performed at step S1205. At step S1210, the kind of the event received at step S1204 is determined.

When a user presses the authorization button 421 shown in FIG. 4, the camera control request command of FIG. 5A is issued to the camera server device 11 (step S1211), and the process waits for an authorization response (step S1212). If an authorization response is returned, it means authorization has been acquired, and therefore a camera control connection to the camera server device 11 is established. The authorization is validated (step S1213) and operation of the camera control panel 42 is enabled (step S1214). If the authorization response is not returned, it means authorization has not been acquired, and therefore a camera control connection is not established. The process ends with the authorization left invalid.

When the user presses the operation termination button after a camera control connection is established, the camera control termination request command of FIG. 5B is issued (step S1221) to close the camera control connection. The authorization is invalidated (step S1222) to disable operation of the camera control panel 42 (step S1223).

When authorization is taken away by a schedule or other client program with a higher authorization level, the camera control connection is forcedly closed by the camera server device 11. In this case, the authorization is invalidated at step S1231 to disable operation of the camera control panel 42 (step S1232).

When operation of the camera control panel 42 is enabled, if a user operates the scroll bar 423, 424, 425 or the button 426 to 429 of the FIG. 4, a camera control command (FIG. 5C to 5E) corresponding to the operation is generated (step S1241) and issued to the camera server device 11 (step S1242). The explanation of the process for generating the command is omitted here.

When the image data of FIG. 5H arrives, compressed image data in the image data is read out and expanded at step S1251, then the image frame data is used to update the image displayed on the image display panel 41 (step S1252).

In response to a client program termination request issued by operation of a menu and the like, the image display termination request command of FIG. 5G is issued (step S1261) and the client program ends (step S1262).

It should be noted that for setting the authorization level not to 0 (lowest) but to the administrator level (authorization level 2) at initialization of step S1201 in FIG. 13, the authorization level is set to the administrator level and a password set via user input is specified to issue a camera control start request at step S1202.

As described above, according to the first embodiment, the authorization level of a schedule including abnormality detection can be set. Accordingly, by setting a high authorization level for the schedule, it is possible to prevent other terminals from taking away authorization while the schedule is executed, and disable camera control by external terminals other than a desired terminal. This solves the problem that abnormality detection for a monitored target is disabled due to unexpected camera control performed by an undesirable terminal while a schedule is executed. Furthermore, it is possible to use a camera as a Web camera for delivering to an unspecified number of terminals during the day and as an abnormality monitoring camera at night, depending on the scheduled operation.

In the first embodiment, abnormality detection is performed in the scheduled operation, the embodiment may be also applied to the case where particular pan angle, tilt angle and zoom magnification are simply fixed through authorization at a particular level based on a schedule to record an image, without detecting an abnormality.

In addition to the case where particular pan angle, tilt angle and zoom magnification should be fixed during schedule execution, it is also possible to specify an authorization level in the case where any detected moving object, such as a suspicious person, should be automatically tracked by the camera server device 11.

Even if authorization is taken away by a higher authorization level terminal, the authorization automatically returns to the scheduled operation when the terminal releases the authorization. Thus, the desired scheduled monitoring can be continued.

Second Embodiment

In the second embodiment, in addition to the features of the first embodiment, the scheduler is controlled only from particular addresses. In the second embodiment, a schedule table as shown in FIG. 15A is used instead of that of FIG. 11A. Except for this, the second embodiment is almost the same as the first embodiment, so that only processings related to FIGS. 15A and 15B are described here.

FIG. 15A is similar to FIG. 11A to which "authorized address group" added as an item, and other items are the same as those shown in FIGS. 11A to 11C. FIG. 15B is a table showing entries of the authorized address group. The table shows a list of addresses for which camera control is permitted while a predetermined schedule operates. Thus, in the authorization management process in FIG. 7, determination whether the address of the terminal requesting authorization corresponds to any address in the authorized address group is added to the determination at step S606.

In this case, a list of authorized addresses for the schedule being executed is read from the table in FIG. 15B. After step S606, the address of the terminal requesting authorization is compared with the addresses on the list. If the address does not correspond, authorization is not given. This makes it possible for the scheduler to accept camera control only from particular addresses during a particular time period.

Thus, when each schedule is executed, camera control can be surely prevented from being performed by an undesirable terminal during the execution of the schedule.

In this way, it is possible to prevent a camera from being controlled by terminals other than a predetermined terminal during a particular operation of the camera.

Other Embodiments

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIGS. 6 to 10 and 12 described in the embodiments.

The present invention is not limited to the above embodiments and various changes and modifications can be made within the spirit and scope of the present invention. Therefore to apprise the public of the scope of the present invention, the following claims are made.

What is claimed is:

1. A control method for controlling an image pickup apparatus in an image delivery system that delivers images acquired from the image pickup apparatus to at least one of external devices, the image pickup apparatus being remotely controllable by the external devices, the method comprising:
   controlling the image pickup apparatus based on a schedule which includes a set of control data to control the image pickup apparatus and a priority level of the schedule;
   comparing, in a case where a request for remotely controlling the image pickup apparatus is received from one of the external devices when the image pickup apparatus is controlled based on the schedule, a priority level of the requesting external device with the priority level of the schedule including the set of control data used at the time when the request is received;
   inhibiting remote control of the image pickup apparatus by the requesting external device if the priority level of the schedule is higher than the priority level of the requesting external device as a comparison result; and
   allowing the requesting external device to control the image pickup apparatus if the priority level of the schedule is lower than the priority level of the requesting external device as a comparison result.

2. The control method according to claim 1 further comprising forcingly stopping control performed based on the schedule if the priority level of the requesting external device is higher than the priority level of the schedule as a comparison result.

3. The control method according to claim 1, wherein the control data includes at least one of a zoom value, a pan control value and a tilt control value of the image pickup apparatus.

4. The control method according to claim 1, wherein a tracking operation is performed for an object moving in an image acquired from the image pickup apparatus during the control performed based on the control data.

5. The control method according to claim 1 further comprising:
   detecting presence of an abnormality based on an image acquired from the image pickup apparatus during the control performed based on the control data; and
   saving the image acquired from the image pickup apparatus when any abnormality is detected.

6. The control method according to claim 5, wherein an abnormality is detected based on difference between frames of the image.

7. An image delivery apparatus that delivers images acquired from an image pickup apparatus to at least one of external devices, the image pickup apparatus being remotely controllable by the external devices, the image delivery apparatus comprising:
   a data storage medium that stores a schedule which includes a set of control data to control the image pickup apparatus and a priority level of the schedule;
   a schedule execution unit that starts control of the image pickup apparatus based on the schedule;
   a comparison unit that compares, in a case where a request for remotely controlling the image pickup apparatus is received from one of the external devices when the image pickup apparatus is controlled based on the schedule, a priority level of the requesting external device with the priority level of the schedule including the set of control data used at the time when the request is received;
   a restriction unit that inhibits remote control of the image pickup apparatus by the requesting external device if the priority level of the schedule is higher than the priority level of the requesting external device as a comparison result; and
   a control unit that executes the remote control of the image pickup apparatus by the requesting external device if the priority level of the schedule is lower than the priority level of the requesting external device as a comparison result.

8. The image delivery apparatus according to claim 7 further comprising a unit that forcingly stops control by said schedule execution unit if the priority level of the requesting external device is higher than the priority level of the schedule as a comparison result.

9. The image delivery apparatus according to claim 7, wherein the control data includes at least one of a zoom value, a pan control value and a tilt control value of the image pickup apparatus.

10. The image delivery apparatus according to claim 7, wherein a tracking operation is performed for an object moving in an image acquired from the image pickup apparatus during control by said schedule execution unit.

11. The image delivery apparatus according to claim 7, further comprising:
    a detection unit that detects presence of an abnormality based on an image acquired from the image pickup apparatus during control by said schedule execution unit; and
    a saving unit that saves the image acquired from the image pickup apparatus when any abnormality is detected by said detection unit.

12. The image delivery apparatus according to claim 11, wherein said detection unit detects an abnormality based on difference between frames of the image.

13. A storage medium readable by a data processing apparatus, the storage medium storing a program which is executable by the data processing apparatus and comprises program codes realizing a control method described in claim 1.

14. A storage medium readable by a data processing apparatus, the storage medium storing a program which is executable by the data processing apparatus and comprises program codes which causes the data processing apparatus to function as an image delivery apparatus described in claim 7.

* * * * *